United States Patent
Bischof et al.

(10) Patent No.: US 7,563,831 B2
(45) Date of Patent: Jul. 21, 2009

(54) METHOD FOR CURING A COMPOSITION

(75) Inventors: Markus Bischof, Warthausen (DE); Elisabeth Gemmler, Ulm (DE); Fritz Mezger, Schoenaich (DE); Thomas Raith, Westerstetten (DE); Christoph Ruechardt, Stegen (DE)

(73) Assignee: Daimler AG, Stuttgart (DE)

( * ) Notice: Subject to any disclaimer, the term of this patent is extended or adjusted under 35 U.S.C. 154(b) by 259 days.

(21) Appl. No.: 11/318,179

(22) Filed: Dec. 23, 2005

(65) Prior Publication Data
US 2006/0142502 A1  Jun. 29, 2006

(30) Foreign Application Priority Data
Dec. 27, 2004  (DE) ........................ 10 2004 063 607
Sep. 20, 2005  (DE) ........................ 10 2005 044 784

(51) Int. Cl.
C08F 2/46 (2006.01)
C08F 2/48 (2006.01)
C08F 2/50 (2006.01)

(52) U.S. Cl. ............... 522/4; 522/7; 522/12; 522/13; 522/60; 522/71; 522/182; 525/330.3; 525/329.7; 525/330.5

(58) Field of Classification Search ............. 525/330.3, 525/329.7, 330.5; 522/4, 7, 12, 13, 60, 71, 522/182
See application file for complete search history.

(56) References Cited

U.S. PATENT DOCUMENTS

| 7,091,256 B2 * | 8/2006 | Bischof et al. ............. 522/8 |
| 2005/0020711 A1 | 1/2005 | Bischof et al. ............. 522/33 |

FOREIGN PATENT DOCUMENTS

| DE | 103 28 473 | 2/2005 |
| DE | 103 45 903 | 5/2005 |
| EP | 0 247 563 | 12/1987 |
| EP | 0 540 884 | 5/1993 |
| JP | 05-179156 | * 7/1993 |
| WO | WO 2005/000915 | 1/2005 |

* cited by examiner

Primary Examiner—Roberto Rábago
(74) Attorney, Agent, or Firm—Davidson, Davidson & Kappel, LLC

(57) ABSTRACT

A method for curing a chemical composition, the composition containing at least one or more binders having ethylenically unsaturated groups, as well as one or more initiators for triggering a radical polymerization. The method includes a thermal curing step, in which the curing of the composition is effected by a radical polymerization of the binder, which is triggered by a thermal initiator and is carried out under protective gas. Paint films having improved mechanical properties can be produced using the method according to the present invention.

15 Claims, No Drawings

METHOD FOR CURING A COMPOSITION

Priority is claimed to German Patent Applications DE 10 2004 063 607.9, filed Dec. 27, 2004 and DE 10 2005 044 784.8, filed Sep. 20, 2005, the entire disclosures of which are incorporated by reference herein.

FIELD OF THE INVENTION

The present invention relates to a method for curing a chemical composition containing at least one or more binders having ethylenically unsaturated groups, as well as one or more initiators for triggering a radical polymerization. The method according to the present invention is suited for industrial applications, for example in the area of paint compositions (paints) and the curing thereof when painting automobile bodies. For the sake of simplicity, the method according to the present invention is, therefore, clarified in the following with reference to paints as examples of curable chemical compositions. However, it is not limited thereto.

BACKGROUND

As a general rule, metallic surfaces are painted to protect them from the effects of weathering exposure and corrosion. Metallic or plastic surfaces are also painted for decorative purposes. This holds especially for the painting of workpieces in the automotive industry. Two-component polyurethane paints (2K-PUR) have achieved acceptance as standard technology, since they cure at low temperatures and permit flexible adaptation of the paint film to the substrates. Paint films of this kind are also distinguished by satisfactory weathering resistance.

Photochemically (light) curing paints, in particular, promise qualitative improvements. Of these, UV-cured paints are principally used. Typical fields of application of such paint systems are found in the electronics industry, printing, furniture, parquet flooring, and paper industry.

The paints used in this context often contain binders having ethylenically unsaturated groups suited for polymerization (reactive groups). Acrylate or methacrylate groups are often used as the reactive groups. Typically, the hardening reaction started by the photochemical initiators (photoinitiators) of the known paint systems is radical polymerization triggered by UV radiation.

Multilayer automobile coatings are generally composed of a sequence of several functional layers that contain an anticorrosion layer, such as a phosphate coating, primer, a pigment-containing base coat and a final transparent clear coat.

The top paint layers generally include:
- a base coat for providing color and setting the color effect (such as metallic); and
- a clear coat as a protective layer against weathering, solvents and scratches.

The mechanical properties of the light-curing or UV-curing paint systems are typically better than those of conventional annealed enamels. It is difficult, if not impossible to completely cure pure UV paints in shaded regions. This is especially true of geometrically complex components where the paint is also applied or deposited in shaded regions, depending on the application method used, such as dipping, spraying or spattering.

Curable clear coats having binders based on poly(meth) acrylic functional compounds, polyisocyanate, light stabilizers and photoinitiators are known from European Patent Application No. EP 247 563 A2, which is incorporated by reference herein. The final hardness of the paint films described therein is achieved by additional cross-linking in which a part of the light-cross-linkable binders react via still free hydroxyl groups with polyisocyanates to form urethanes (polyaddition).

From European Patent Application No. EP 540 884 A1, which is incorporated by reference herein, a two-step method is known for producing a multilayer coating for automobiles. The paint formulation used in a final clear coat contains radically and/or
cationically curing binders. The hardening is started by UV radiation, and the final hardness is only attained in a second method step. In the second method step, annealing is preferably carried out at temperatures of approximately 80 to 160° C. In one of the variations of the method, heat-activable radical initiators are also used.

The non-prepublished German Patent Application No. DE 103 45 903.0, which is incorporated by reference herein, discusses a reactive paint for achieving complete hardening under exposure to air which contains binders bearing ethylenically unsaturated groups and which is thermally curable or curable in accordance with the dual-cure method and by radical polymerization induced by UV light or high-energy radiation. The paint contains a combined initiator system including a thermal initiator and a UV initiator or a thermal initiator system. In addition, as binders, it contains reactive oligomers, such as additive compounds of a pentaerythritol derivative and an isocyanurate derivative. A method is also described for curing the paint by radical polymerization in which the polymerization is initially thermally started under air and is then continued as a thermal or photoinitiated process under air or under a protective gas.

The problem associated with the known paint systems is that the mechanical properties of their paint films, such as hardness, are still less than satisfactory. Conventional paint films exhibit a low scratch resistance, so that they can be easily scratched, for example, unintentionally in automatic car washes or by sharp objects used in wanton acts of vandalism. This is especially true of paint systems having binders which cure by thermally initiated polymerization. These problems are not the least attributable to unsuitable curing methods, which only lead to the production of paint films having inferior mechanical properties.

SUMMARY OF THE INVENTION

It is an object of the present invention to provide a method for curing curable chemical compositions which will make it possible to obtain paint films having improved mechanical properties.

Thermally initiated curing of chemical compositions, in particular of paints, whose curing is based on the polymerization of a polymerizable binder, is typically carried out under exposure to air, paint films having less than satisfactory mechanical properties generally being obtained. In the context of the present invention, it was discovered that such curing processes result in improved mechanical properties of the paint films when the curing or polymerization process is carried out under protective gas.

The present invention provides a method for curing a composition, the composition containing at least one or more binders having ethylenically unsaturated groups, as well as one or more initiators for triggering a radical polymerization. In accordance with the present invention, the method includes a thermal curing step, in which the curing of the composition is effected by a radical polymerization of the binder, which is triggered by a thermal initiator and is carried out under protective gas.

Paint films having improved mechanical properties, such as hardness and scratch resistance, are obtained using the method according to the present invention. This is discussed in greater detail in the context of the practical examples.

Another advantage of the method according to the present invention is that it enables the radical polymerization to also be used as a curing mechanism for three-dimensional objects having shaded regions.

Another advantage of the method according to the present invention is that curing may be carried out at low temperatures.

DETAILED DESCRIPTION

The composition is preferably a paint composition, i.e., a paint or a paint system.

The thermal curing step is carried out under exposure to heat, i.e., in the course of a heat treatment. The heat treatment is preferably carried out in a forced air oven or in an oven equipped with infrared radiators as heat sources. In the process, the thermal initiator decomposes to form radicals which trigger (initiate) a radical polymerization of the binder.

In this context, suitable thermal initiators are: organic azo compounds, organic peroxides, C—C-splitting initiators such as benzpinacol silyl ethers, hydroxy imides such as N-hydroxyphthalimide or N-hydroxysuccinimide, N,N-diacyl hydroxylamines, O-alkylated N,N-diacyl hydroxylamines and/or O-acylated N,N-diacyl hydroxylamines. Highly suitable azo compounds include thermally labile substituted azo compounds such as azonitriles, cyclic and non-cyclic azoamides, azocumene or azocarboxylic acid esters.

2,2'-Azobis(4-methoxy-2,4-dimethylvaleronitrile, 2,2'-azobis(2,4-dimethylvaleronitrile), dimethyl-2,2'-azobisisobutyrodinitrile (AIBN) or dimethyl-2,2'-azobisisobutyrate are preferable. 4,4'-Azobis(4-cyanopentanoic acid) or its alkali metal salts are preferred polar solvents. The storability of azo compounds is better than that of peroxides.

Among the peroxy compounds suitable as thermal initiators are representatives of the different classes of peroxide compounds that have a low decomposition temperature, preferably having a half-life $t_{1/2}$ of less than one hour at temperatures below 100° C. Preferred representatives are dialkyl peroxides, diacyl peroxides, peroxydicarbonates, perketals, peroxycarboxylic acids and their esters, ketone peroxides and/or hydroperoxides. Particularly preferred are di(3,5,5-trimethylhexanoyl) peroxide, didecanoyl peroxide, dilauroyl peroxide, dibenzoyl peroxide, di-(2-ethylhexyl) peroxydicarbonate, dicyclohexyl peroxydicarbonate, di(4-tert.butyl cyclohexyl)peroxydicarbonate, dimyristyl peroxydicarbonate, diacetyl peroxydicarbonate, di-tert.butylperoxyoxalate, as well as peroxycarboxylic acid esters from the reaction products between pivalic acid, neodecanic acid or 2-ethylhexanic acid and tert.butyl hydroperoxide, tert.amyl hydroperoxide, cumyl hydroperoxide, 2,5-dimethyl-2,5-dihydroperoxyhexane and 1,3-di(2-hydroxyperoxyisopropyl)benzene. Disuccinoyl peroxide is especially suited for aqueous media.

The decomposition temperatures of the peroxide compounds can sometimes be advantageously reduced by adding coinitiators such as heavy-metal salts and/or tertiary amines.

Also suited as thermal initiators are compounds having a radical-forming grouping of activated hyroxylamine, O-alkylated alkylhydroxylamine, or O-acylated acylhydroxylamine derivatives, as described in the German Patent Application No. DE 103 28 473 A1 of the applicant. Among these are, in particular, N,N-diacylhydroxylamines, O-alkylated N,N-diacylhydroxylamines and/or O-acylated N,N-diacylhydroxylamines, which are indicated by the general formulas (1), (2) and (3):

N,N-diacylhydroxylamine:

R—CO—N(OH)—CO—R'    (1)

O-alkylated N,N-diacylhydroxylamine:

R—CO—N(O—R")—CO—R'    (2)

O-alcylated N,N-diacylhydroxylamine:

R—CO—N(O—CO—R''')-CO—R'    (3)

R, R', R'' and R''' signify the same or different organic substituents that are especially selected from the group of aliphatic, linear, branched and/or cyclic substituted and/or unsubstituted hydrocarbons. R, R' and/or R''' can also be aromatic hydrocarbons, such as a phenyl residue.

Preferably, R, R', R'' and/or R''' include hydrocarbon chains having a chain length of 2 to 18 atoms. The hydrocarbon chains may also be interrupted by heteroatoms from the group consisting of N, O and/or S. For example, R, R', R'' or R''' can be derived from natural fatty acids.

The R and/or R' groups preferably close to form a chain having a length of 2 to 10 atoms.

The R and R' groups preferably form a closed ring system, whereby the N,N-diacylhydroxylamine group is bound via the acyl groups to the ring system. The ring system contains a benzene ring, naphthalene or anthracene, for example.

Of the hydroxylamines, N-hydroxyphthalimide and N-hydroxysuccinimide are especially preferred as thermal initiators.

Suitable here as well is a system of two or more of the aforementioned thermal initiators (in short: initiator system).

In the case of the N,N-diacylhydroxylamines, O-alkylated N,N-diacylhydroxylamines and the O-acylated N,N-diacylhydroxylamines, the initiator system may contain a coinitiator that contains metal ions. Suitable coinitiators are described, for example, in the German Patent Application No. DE 103 28 473 A1 of the applicant. The preferred metal ions are derived from metals having at least two oxidation states ranging from I to VIII, for example the transition metals Ti, V, Cr, Mo, W, Mn, Fe, Co, Rh, Ir, Ni, Rh, Ir, Pd, Pt and/or Cu. Particularly preferred are cobalt ions having the oxidation states of II or III, possibly in combination with other metal ions. The ions of alkali or alkaline earth metals, such as Li, K, Ca, Sr, Ba, and Bi, Pb, Zn, Cu, Zr and/or Ce can be present as additional metal ions of the coinitiator to improve the effect of the coinitiator.

As binders, those having ethylenically unsaturated groups are used, which are radically polymerizable. Among the preferred ethylenically unsaturated groups or monomers are especially acrylates, methacrylates, vinyl esters, vinyl ethers, acrylamides, vinyl chloride, acrylonitrile, butadiene, unsaturated fatty acids, styrene derivatives, maleic acid or fumaric acid groups. Typical oligomer representatives that bear these reactive groups are polyesters, urethanes, alkyd resins, epoxides, polyethers or polyolefins. Particularly preferred are multiply (meth)acrylate-substituted monomers and oligomers.

Reactive oligomers are also suited. These include polyfunctional acrylate-modified isocyanurates obtainable by reacting a pentaerythritol derivative of general formula (4) with an isocyanurate group of general formula (5).

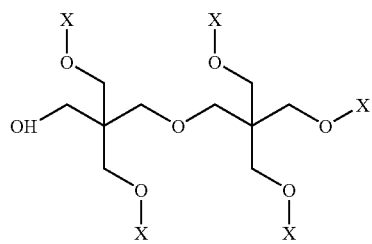

(4)

where X=—CO—CH=CH$_2$, —C$_n$H$_m$ or —CO—C$_n$H$_m$, —C$_n$H$_m$ being=aliphatic group having 1 to 3 C atoms, 0, 1, 2 or 3 X substituents being formed by —C$_n$H$_m$ and/or —CO—C$_n$H$_m$.

All X substituents are preferably formed by —CO—CH=CH$_2$. The resulting compound is also termed dipentaerythritol pentaacrylate. However, dipentaerythritolhexaacrylate can also be present.

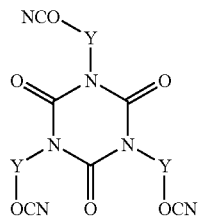

(5)

Y denotes an organic molecular chain having a length of 3 to 8 atoms, the organic molecular chain of Y having at least 3 C atoms, and other hetero atoms that may be present being formed by N, O and/or S. The molecular chain Y is preferably an aliphatic group, especially a molecular chain made up of 6 methylene groups. The organic molecular chain Y can also bear other reactive groups, however, especially from the class of isocyanates and/or acrylates and/or methacrylates.

The addition compounds of both reactants (4) and (5) are formed by a condensation reaction between the free hydroxyl group(s) of the compound of formula (4) and the isocyanate groups of the compound of formula (5).

The three Y substituents of a central 2,4,6-keto-1,3,5-triazine unit (also termed isocyanurate) can be different from each other. Likewise, mixtures of different addition compounds from (4) and (5) are suitable as reactive oligomers.

In principle, any gas that is inert toward the chemicals used (inert gas) is suited as a protective gas. Gases such as N$_2$, CO$_2$ or Ar are suited. Preferred are, however, inexpensive gases such as CO$_2$ and N$_2$. CO$_2$ has the advantage that it collects at the bottom of vessels and is thus easy to handle. Suitable protective gases are, in particular, non-toxic and non-combustible.

By implementing the method according to the present invention, the radicals formed are efficiently utilized for conventional radical polymerization. As a result, it is possible to advantageously reduce the required amount of thermal initiator. This has a positive effect, inter alia, on the costs and the yellowing tendency of the paint finishes produced in accordance with the method of the present invention. Alternatively to reducing the initiator quantity, initiators which are more inert may also be used. The benefit thereby derived is that the compositions are more stable in storage and easier to handle.

Another embodiment of the method according to the present invention provides for the thermal curing step to be followed by a photochemical curing step, in which the curing of the composition is effected by a radical polymerization of the binder, which is triggered by a photochemical initiator.

The second photochemical curing step makes it possible to obtain paint films which are especially hard and scratch resistant.

The photochemical curing step is carried out under exposure to electromagnetic radiation, the electromagnetic radiation having a wavelength that is absorbed by the photochemical initiator (photoinitiator). Wavelengths are suited which are preferably within the range of visible and/or UV light. In the process, the photochemical initiator decomposes to form radicals which trigger (initiate) a radical polymerization of the binder.

Suitable photochemical initiators are: derivatives of benzoin, benzophenone, thioxanthone, anthraquinone, acylphosphine oxide or acetophenone. Preferred are 1-hydroxy-cyclohexyl-phenyl ketone and/or diphenyl(2,4,6,trimethylbenzoyl) phosphine oxide. In addition, azo compounds are suited that are excitable or splittable by UV light or by high energy radiation. Azo compounds of this kind are especially preferred since they can act both as thermal initiators and as photochemical initiators. Especially suited in this case are the azo compounds already discussed above with reference to the thermal initiators.

A system made up of two or more of the aforementioned photoinitiators (initiator system) is also suited.

Till now, the prevailing opinion has been that, due to their lower decomposition rate, thermal initiators produce a lower radical density and thus a less satisfactory curing quality than photochemical initiators. The prevailing opinion has also been that, at the high temperatures of a thermal curing step, all of the ethylenically unsaturated groups react in spite of the unsatisfactory curing quality obtained using the conventional methods. Following this assumption, ethylenically unsaturated groups would no longer be available for a subsequent, photochemically initiated curing step. The assumption has also been that, at the high temperatures of a thermal curing step, photoinitiators are extracted from the reaction mixture by sublimation and/or, as the case may be, by decomposition. For that reason, in known methods heretofore, either no thermal-radically acting initiators were used or, in dual cure methods, a photochemically initiated curing step was performed as a first curing step.

However, within the context of the present invention, it was surprisingly discovered that it is possible to first perform a thermal curing step and, subsequently thereto, a photochemical curing step, when the thermal curing step is carried out under protective gas and suitable binders and initiators are used, and that, in the process, extremely high-quality paint films may be obtained. As a result, the already very high quality of the paint film is able to be further improved with respect to its mechanical properties (hardness, scratch resistance) following the thermal curing step. It is thus possible to obtain paint finishes that can hardly be scratched by steel wool.

The second curing step is, in fact, ineffective at optically inaccessible locations where no light falls (shaded regions or locations); however, this is not disadvantageous since a high-quality paint film comparable in hardness to conventional polyurethane paint finishes is already obtained during the thermally initiated curing step under protective gas. Shaded regions or shaded locations are especially present in complex three-dimensional bodies, such as automotive bodies.

When applying paint coats to objects having shaded regions, it may, in principle, be possible, for a thermally initiated curing step under protective gas to also be carried out subsequently to a photochemical curing step. However, it is precisely the surprising possibility of being able to perform the thermally initiated curing step under protective gas before the photochemically initiated curing step, that makes numerous advantages feasible. For example, a subjacent coat (for instance a base coat) does not yet need to be completely baked, instead, it may be baked together with the composition (preferably a clear-coat finish) during the thermally initiated curing step. As a result, advantages are derived with respect to the adhesion of intermediate layers, and the avoidance of stress cracks, paint defects, and curing defects.

A further benefit is derived in that many days may pass between the thermal curing step and the photochemical curing step, without impairing quality. Thus, one or more additional process steps, such as a polishing step, may be implemented between the thermal and photochemical curing steps. This is especially advantageous since the paint film is still relatively soft and thus workable following the thermal curing step. On the other hand, following the photochemical processing step, the paint film is so hard that it is not easily workable.

The photochemical curing step can, in fact, be carried out under protective gas, in the same way as the thermal curing step, in particular when the curing operation is to be carried out at a substantial distance or using long-wave electromagnetic radiation. However, the photochemical curing step is preferably implemented under exposure to ambient air, since the air hardly interferes or even does not interfere at all in this process step. This advantageously makes this process step technically simpler to implement than if protective gas conditions had to be observed.

In one variant of the method according to the present invention, as initiator, a chemical compound is used which acts both as a thermal initiator and as a photochemical initiator, preferably an azo initiator. An azo initiator is understood in this context to be a chemical compound from the group of azo compounds which decompose thermally as well as photochemically into radicals and can thus act in both cases as radical starters for a radical polymerization. Thus, compounds of this kind are suited as initiators both for the thermal and for the photochemical curing step. Especially suited in this regard are the azonitriles already discussed above in the context of the thermal initiators. Here, the benefit is derived that both curing steps (thermal and photochemical) merely require one initiator, and not two or more, which would then require mutual adjustment.

In another variant of the method according to the present invention, as initiator, a combination of a thermal initiator and a photochemical initiator is used. This advantageously makes it possible for initiators to be used that are optimized for their field of application.

In one further refinement of the method according to the present invention, the thermal initiator or the both thermally as well as photochemically acting initiator is admixed with the remaining components of the composition, less than eight hours before using the composition, preferably less than five hours and, in particular, less than three hours before. This is especially true of a highly thermally reactive initiator. This advantageously makes it possible for the composition to be stored for an extended period of time before the initiator is admixed. A further benefit is that it is possible to use initiators which are more reactive (highly reactive). Such initiators permit more efficient curing, without the composition curing undesirably prior to application.

In one embodiment of the method according to the present invention, the thermal curing step is executed in such a way that one begins with a thermal treatment in the presence of ambient air and then, during the thermal treatment, replaces the ambient air with the protective gas. This makes it possible to avoid defects in the paint film surface, such as an undesirable skin formation which degrades the mechanical properties of the paint film, since the curing begins first deep in the paint film and then continues toward the outer surface which is then under protective gas atmosphere. From this, the possibility is additionally derived of controlling the reaction by suitably adjusting the time period of the reaction under air, the time period of the reaction under protective gas, and the time period during which the air is displaced by the protective gas, to one another.

If the composition in question is a paint, then, besides the components just mentioned (binders and initiators), other components may be present, such as prepolymers, fillers, aggregates, UV stabilizers, organic solvents, nano-particles, surface additives and the like. These components are generally known to one skilled in the art and are therefore not discussed here in greater detail for the sake of conciseness.

The method according to the present invention is advantageously suited for manufacturing thin coatings, preferably as used in painting, particularly in the painting of objects having shaded regions, more particularly for painting automobile bodies, and especially for applying a clear-coat finish to an automobile body having a base coat.

The present invention is explained in greater detail in the following with reference to practical examples that are not to be considered as limiting its scope.

PRACTICAL EXAMPLES

1.) A first cured paint coat based on the following composition was used:
thermal initiator:
2% by weight of dimethyl-2,2'-azobis(2-methylpropionate) (V601 of the firm Wako Chemicals GmbH).
Before using the paint, the initiator was admixed with the following components for 2 hours and 50 minutes.
photoinitiator:
1% by weight of 1-hydroxy-cyclohexyl-phenyl ketone (Irgacure 184 of the firm Ciba Spezialitätenchemie AG).
binders having ethylenically unsaturated groups:
a) 30% by weight of a mixture of hexa-, tri- and bifunctional, aliphatic urethane acrylate and polyether tetraacrylate;
b) 20% by weight of dipentaerythritolhexa-acrylate;
c) 20% by weight of reactive oligomer consisting of dipentaerythritol pentaacrylate (obtainable by reacting a pentaerythritol derivative of general formula (4) with an isocyanurate derivative of general formula (5), all X substituents being formed by —CO—CH=$CH_2$).

UV absorber and free radical scavenger:
  1% by weight of Tinuvin 400 and 1% by weight of Tinuvin 292 (HALS).
  Both compounds are commercially available from the firm Ciba Spezialitätenchemie AG.
solvents:
  remainder up to 100% by weight of butyl acetate.

This paint was spray-coated onto a metallic substrate (thickness 40 μm). The solvent was subsequently expelled (10 minutes, 40° C.) and an $N_2$ protective gas atmosphere subsequently produced. This was followed by a thermal curing step, namely a thermally initiated radical polymerization under $N_2$ protective gas (15 minutes, 130° C.). Cooling to ambient temperature then followed. This was followed by a photochemical curing step, namely a photochemically initiated radical polymerization. To that end, UV radiation having an energy density of 3000 mJ/cm² was applied using a commercial Hg medium-pressure radiator (system type MBS-20-1-R-SLC-SO having light source M200 U2 of the firm IST Metz GmbH). The result obtained was that the applied paint was completely cured to form a durable paint film or a durable paint coat that steel wool could hardly scratch.

2.) Analogously to 1.), other paint coats were produced, different initiators being used and cured in each case, once under protective gas in accordance with the present invention and, for comparison purposes, once under exposure to ambient air. The Martens hardness was ascertained for each of the paint systems obtained in this manner. The Martens hardness was determined using a Fischerscope H100 of the firm Helmut Fischer GmbH in accordance with DIN EN ISO 14577.
The following composition was used:
  binders having ethylenically unsaturated groups:
    a) 60 parts Ebecryl 5129 (UCB Chemicals),
    a) 40 parts IRR 351 (UCB Chemicals).
  solvent:
    20 parts Xylol:butyl acetate=2:1.
  surface additive:
    0.1 parts Byk 331 (Byk Chemie).
  thermal initiator:
    V601 or V65 (Wako Chemicals).
The results are indicated in the following table:

The table reveals that, in the examples according to the present invention in which thermal curing was carried out under protective gas, paint films were consistently obtained whose mechanical properties (in this case: hardness) were superior to those of the comparison examples in which thermal curing was carried out under ambient air.

What is claimed is:

1. A method for curing a composition containing at least one binder having ethylenically unsaturated groups and at least one initiator for triggering a radical polymerization, the method comprising:
  performing at least part of a duration of a thermal curing step under a protective gas, wherein thermal curing of the composition is effected by a radical polymerization of the at least one binder triggered by a thermal initiator; and
  performing a photochemical curing step following the thermal curing step, wherein the photochemical curing of the composition is effected by a further radical polymerization of the at least one binder triggered by a photochemical initiator.

2. The method as recited in claim 1, wherein the photochemical curing step is performed under exposure to ambient air.

3. The method as recited in claim 1, the thermal initiator and the photochemical initiator are the same chemical compound.

4. The method as recited in claim 3, wherein the chemical compound is an azo.

5. The method as recited in claim 1, wherein the thermal initiator and a photochemical initiator are different chemical compounds.

6. The method as recited in claim 1, further comprising:
  admixing at least one of the thermal initiator and the photochemical initiator with the at least one or more binders of the composition; and
  using the composition less than eight hours after the admixing.

7. The method as recited in claim 6, wherein the using is performed less than five hours after the admixing.

| Number | Initiator | Quantity [percent by weight] [1] | Curing under PG or under AA [2] | Time period [minutes] [3] | Temperature [° C.] [4] | Marten hardness [mN/cm²] |
|---|---|---|---|---|---|---|
| 1a | V601 | 1 | PG | 25 | 80 | 22.1 |
| 1b | V601 | 1 | AA | 25 | 80 | .../...[5] |
| 2a | V601 | 3 | PG | 10 | 80 | 12.5 |
| 2b | V601 | 3 | AA | 10 | 80 | .../...[5] |
| 3a | V601 | 1 | PG | 5 | 130 | 147.8 |
| 3b | V601 | 1 | AA | 5 | 130 | .../...[5] |
| 4a | V601 | 3 | PG | 5 | 130 | 162.8 |
| 4b | V601 | 3 | AA | 5 | 130 | .../...[5] |
| 5a | V601 | 3 | PG | 25 | 130 | 177.8 |
| 5b | V601 | 3 | AA | 25 | 130 | .../...[5] |
| 6a | V65 | 3 | PG | 5 | 130 | 171.6 |
| 6b | V65 | 3 | AA | 5 | 130 | 36.9 |
| 7a | V65 | 3 | PG | 25 | 130 | 180.6 |
| 7b | V65 | 3 | AA | 25 | 130 | 63.1 |
| 8a | V65 | 3 | PG | 5 | 80 | 116.7 |
| 8b | V65 | 3 | AA | 5 | 80 | .../...[5] |

[1] based on the total weight of the composition
[2] PG = protective gas (in accordance with the present invention); AA = ambient air (comparison).
[3] duration of the thermal curing step.
[4] temperature during the thermal curing step.
[5] no discernible curing.

8. The method as recited in claim 6, wherein the using is performed less than three hours after the admixing.

9. The method as recited in claim 1, wherein the thermal curing step includes performing a thermal treatment in the presence of ambient air and, during the thermal treatment, replacing the ambient air with the protective gas.

10. The method as recited in claim 1, further comprising forming a thin coating from the composition.

11. The method as recited in claim 10, wherein the thin coating is a paint.

12. A method for painting an object, the method comprising:
   providing a composition containing at least one binder having ethylenically unsaturated groups and at least one initiator for triggering a radical polymerization on the object; and
   curing the composition by the steps of:
      performing at least part of a duration of a thermal curing step under a protective gas, wherein thermal curing of the composition is effected by a radical polymerization of the at least one binder triggered by a thermal initiator; and
      performing a photochemical curing step following the thermal curing step, wherein the photochemical curing of the composition is effected by a further radical polymerization of the at least one binder triggered by a photochemical initiator.

13. The method as recited in claim 12, wherein the object includes at least one shaded region.

14. The method as recited in claim 12, wherein the object is an automobile body.

15. The method as recited in claim 14, wherein the automobile body includes a base coat and wherein the composition is a clear coat finish.

* * * * *